United States Patent [19]
van Steenbrugge et al.

[11] Patent Number: 5,463,619
[45] Date of Patent: Oct. 31, 1995

[54] LOCAL COMMUNICATION BUS SYSTEM COMPRISING A SET OF INTERCONNECTED DEVICES, A CONTROL BUS, AND A SET OF SIGNAL INTERCONNECTIONS, AND A DEVICE AND A SWITCHBOX FOR USE IN SUCH SYSTEM

[75] Inventors: Bernard van Steenbrugge; Henricus de Leeuw; Mihalis Mastroyiannis, all of Eindhoven, Netherlands

[73] Assignee: U.S. Philips Corporation, New York, N.Y.

[21] Appl. No.: 717,171

[22] Filed: Jun. 17, 1991

Related U.S. Application Data

[63] Continuation of Ser. No. 410,389, Sep. 20, 1989, abandoned, which is a continuation-in-part of Ser. No. 86,442, Aug. 17, 1987, abandoned.

[30] Foreign Application Priority Data

Sep. 21, 1988 [GB] United Kingdom .................... 8822193

[51] Int. Cl.⁶ ..................................................... H04J 3/02
[52] U.S. Cl. ............................................................ 370/58.1
[58] Field of Search ....................... 340/825.02, 825.08; 381/77; 370/58.1, 58.2, 85.1, 85.9, 85.11

[56] References Cited

U.S. PATENT DOCUMENTS

| | | | |
|---|---|---|---|
| 4,347,498 | 8/1982 | Lee et al. ............................ | 340/825.02 |
| 4,427,918 | 1/1984 | York ................................. | 340/825.02 X |
| 4,429,384 | 1/1984 | Kaplinsky ................................. | 370/85 |
| 4,675,668 | 6/1987 | Ise et al. ............................. | 340/825.08 |
| 4,763,329 | 8/1988 | Green .............................. | 340/825.02 X |
| 4,845,756 | 7/1989 | Seen et al. ................................. | 381/77 |
| 5,054,022 | 10/1991 | Van Steenbrugge ................... | 370/85.6 |

Primary Examiner—Douglas W. Olms
Assistant Examiner—Min Jung
Attorney, Agent, or Firm—Anne E. Barschall

[57] ABSTRACT

A local communication bus system including a serial control bus connected to a plurality of user terminal devices and at least one switchbox device, each terminal device being plug connected to at least one of the switchbox devices so as to provide respective signal interconnection paths there-between, each device having at least one plug and containing a readable interconnection table specifying to which plugs of other devices it is connected. A signal path from a terminal device operating as a signal source to a terminal operating as a signal destination is established by control commands generated on the connection bus by a control unit in the source device and which cause the intervening switchboxes to establish the requisite internal connections between their plugs. The system thereby does not require any central control. The interconnection table of a terminal device only needs to identify its own plugs and those of other devices to which it is plug are connected.

22 Claims, 2 Drawing Sheets

5,463,619

LOCAL COMMUNICATION BUS SYSTEM COMPRISING A SET OF INTERCONNECTED DEVICES, A CONTROL BUS, AND A SET OF SIGNAL INTERCONNECTIONS, AND A DEVICE AND A SWITCHBOX FOR USE IN SUCH SYSTEM

This is a continuation of application Ser. No. 07/410,389, filed Sep. 20, 1989, now abandoned which is a continuation-in-part of application Ser. No. 07/086,442, filed Aug. 17, 1987, now abandoned.

BACKGROUND OF THE INVENTION

1. Field of the Invention

The invention relates to a local communication bus system comprising a single-channel control bus connected to a plurality of user terminal devices that are pairwise interconnected by respective signal interconnections. The system also includes at least one plural-interconnected switchbox means, and is able to establish a signal path between an initiating or source terminal and a destination terminal.

2. Description of the Related Art

A communication system having a single-channel control bus has been described in U.S. Pat. No. 4,429,884, herein incorporated by reference. Such a control bus is particularly suited for transfer of control signals between various user terminal for consumer entertainment, devices for executing household chores, and for producing various maintenance and management control signals in a domestic environment. In addition to the control bus, the various devices are pairwise interconnected by signal interconnections. Herein, pairwise means that either exactly two are interconnected, or that one particular device operates as signal source, whereas the others function exclusively as signal destinations. An example would be one audio amplifier that can selectively power either one of two (or more) loudspeaker boxes. The signals may be analog or digital and may relate to audio or video information or other. Certain devices, although attached to the control bus, need not be interconnected to such signal interconnection inasmuch as they have little or no signal handling facilities, such as switches, sensors etcetera. For these devices, the control bus would provide a data path of sufficient transport capability. Particular properties of such system are the low level of data processing facilities of many of the interconnected devices, and also the frequent configuration changes encountered inasmuch as many devices are portable and liable to plugging and unplugging in various physical attachment points of the control bus. In typical circumstances, such control bus could be wired to all rooms of a house or appartment and in each wired room have one or more wall-mounted plugs. Of course simpler configurations would also do. The devices often have only a single signal interconnection; anyway, the switchbox means have at least two such signal interconnections, typical values are four to six.

SUMMARY TO THE INVENTION

Among other things, it is an object of the present invention to allow for easy and error-free establishment of a signal path between a source device and a destination device without the need for either a central control device or for the storage of all present and valid pairwise signal interconnections in each relevant device, but allowing for only the storage in each device of a local interconnection table. The invention, according to one of its aspects, thereto provides a local communication bus system comprising a single-channel control bus attached to a plurality of devices that are plug to plug pairwise interconnected by respective signal interconnections and include at least one plural-plug switchbox means, said system for establishing and specifying a signal path between a source device and a destination device comprising:

in each respective device, interconnection table means interrogatibly storing information indicating any other device pairwise interconnected to said respective device, and the plug pair so interconnecting that other device;

in said source device first message generating means for generating, in case said source device and destination device are not pairwise interconnected, on said control bus a messaged Connect control command directed to any first switchbox means pairwise connected to said source device and indicating said destination device and in conjunction therewith a messaged Select control command directed to said destination device for thereto signalling and specifying said establishing;

in the first switchbox means so directed at, interrogating means for interrogating its interconnection table means for identifying the plug connected to said destination device if any, and control means for in the negative case controlling said first switchbox means as secondary source device for producing a further Connect control command to any second switchbox means connected thereto, until after a first sequence of such Connect control commands the destination device is reached, thereby said path is identified as a second sequence of such pairwise interconnections, between associated plug pairs, starting from said source device and terminating in said destination device, whereby said destination device is activated by said Select control signal for effecting the intended signal transfer, said system comprising activating means for in an initializing state activating said interconnection table means.

In this respect, the source device is the source of the control message; on the level of the signal transfer it may operate either as signal source, or as signal destination. Now each device has an interconnection table that must only store a list of all local plugs, explicit or implicit, the name or other indication of the device connected thereto, and the latter device's plug used for realizing the connection. The plug may be a physically separated interconnection to a single signal path that is privy to the devices interconnected thereby, the switching being by means of physically exerting connections and disconnections, as the case may be. Alternatively, the switchbox means may interconnect its plugs by means of frequency selecting, in that the signal frequency band on a first plug determines which of the other, frequency-sensitive plugs be connected thereto. In consequence, frequency multiplexing is effected on the first plug. Each switchbox, at any time may interconnect two or more of its plugs, or interconnect plural pairs of its plugs.

Now, if the first switchbox means is not pairwise connected to the intended destination device, it will, by means of the control bus, operate as secondary source device and search any further switchbox means pairwise connected to it; this operation may be executed in a tree organization. In general, the search will terminate after accessing of only a few switchbox means in sequence.

In the above, the Connect control command indicates which device is to operate as destination device (for the control); the Select control command indicates what the destination device is supposed to do. For example, for a video cassette recorder this signal may specify whether the recorder must record video or reproduce video, and for a monitor whether the signal format is YUV or RGB, the operation of the monitor depending thereon.

FURTHER ASPECTS OF THE INVENTION

The invention also relates to a device for use in such system and possibly having various interconnected subdevices, among which at least one switchbox interfacing to other devices.

The invention also relates to a switchbox operating as a device or subdevice.

Further advantageous aspects to the invention are recited in dependent claims.

BRIEF DESCRIPTION OF THE FIGURES

The invention will be disclosed in more particular detail with respect to the appended drawing, in which.

DESCRIPTION OF AN EMBODIMENT AS PREFERRED

Figure 1:
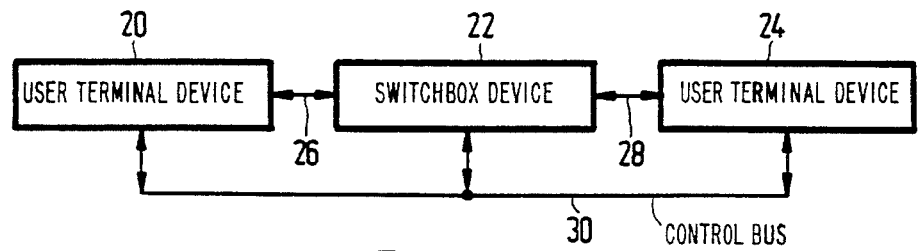
FIG. 1 is a block diagram of an elementary system for use with the invention.

FIG. 1 is a block diagram of an elementary system for use with the invention. This comprises three devices 20, 22, 24, among which device 22 is a switchbox. Interconnections 26, 28, are high volume signal interconnections, for example, for digital or analog video signals. Interconnection 30 is a control bus for relatively low volume messaged control signals.

Figure 2:
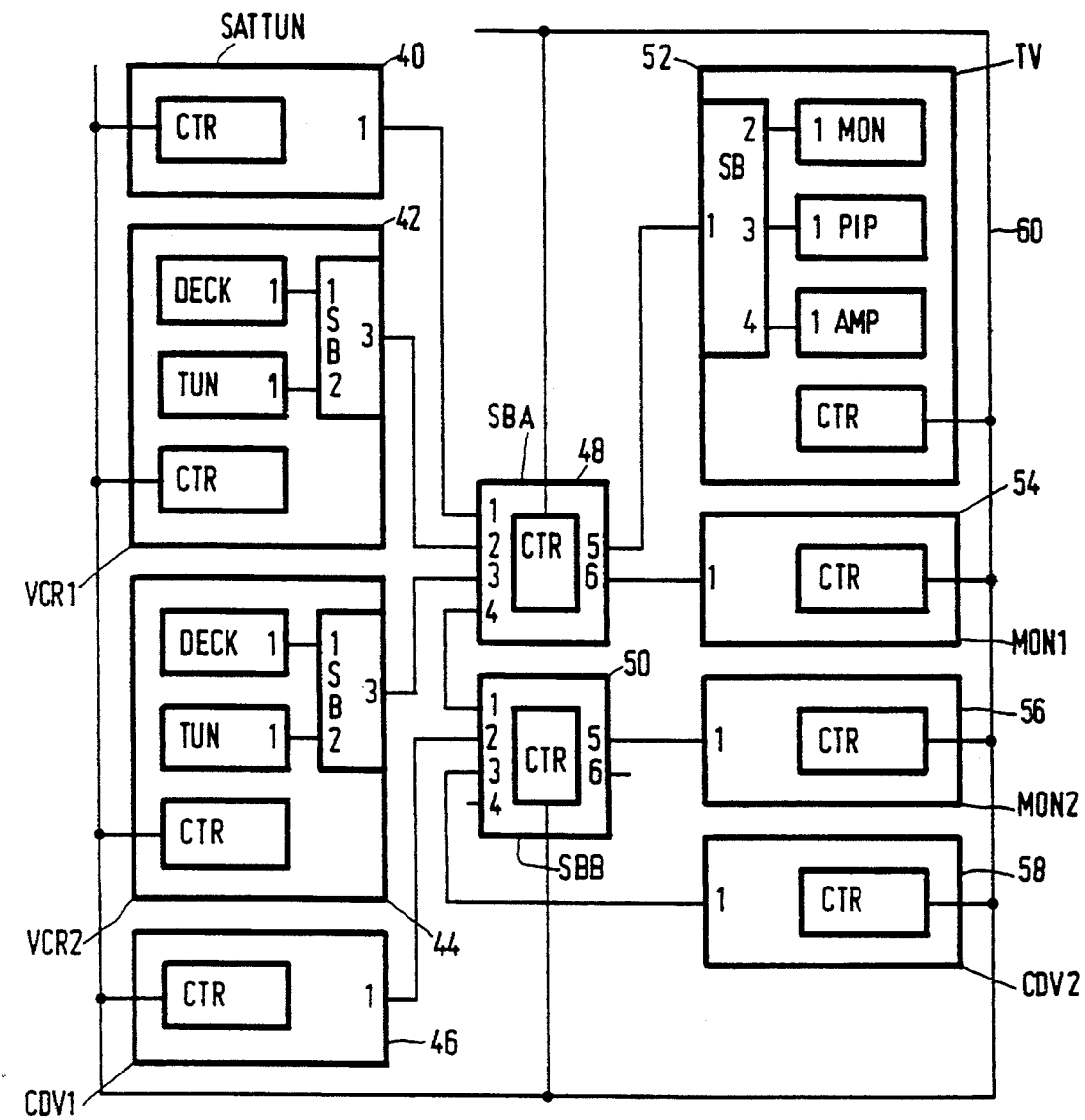
FIG. 2 is a more elaborated block diagram of such system.

FIG. 2 is a more elaborated block diagram of an embodiment for use with the invention. The system is typically video-oriented. Of course, audio-oriented, audio/video-mixed, and other orientations would be feasible as well. There are ten devices: satellite tuner 40, video cassette recorders 42, 44, compact disc video players 46, 58, video monitors 54, 56, TV apparatus 52 and switchboxes 48, 50. Video cassette recorder 42 has as subdevices a cassette deck -DECK-, a video tuner TUN, a control element CTR and a local switchbox SB. TV apparatus 52 has as subdevices monitor MON, picture-in-picture generator PIP, video amplifier AMP, control element CTR, and local switchbox SB. All devices have a control element CTR. All plugs of devices and/or subdevices to the signal interconnections are numbered. These numbers relate to a locally valid plug sequence. All control devices are attached to single-path control bus 60. This may be a coax, twisted pair or optical bus, for example. The control devices will control various operations of the device and, if applicable, its subdevices. In the embodiment shown the various signal interconnections are all physically separate. Other solutions are possible; for example, interconnections 3 and 5 of switchbox 50 could operate in frequency multiplex with respect to a source signal interconnection of which the frequency band determines which one of monitors 56, 58 is going to effect display. To this effect, the switchbox means may comprise a selectively activatable frequency convertor, or the signal source may already effect such conversion.

Figure 3:
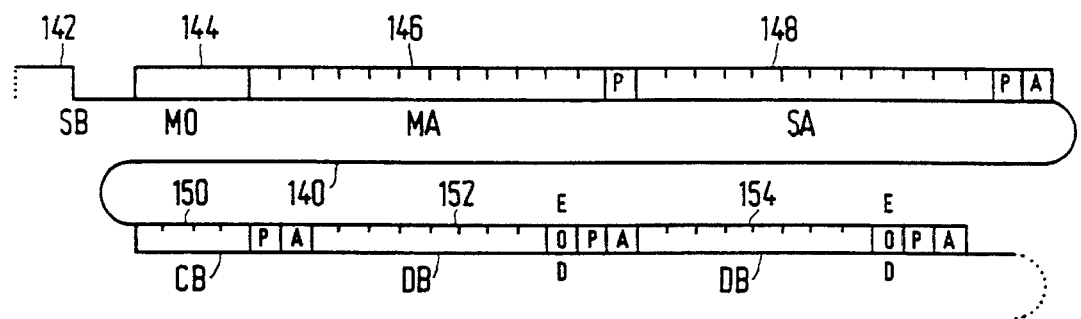
FIG. 3 illustrates a message format.

FIG. 3 illustrates a message format on the control bus. The physical bit shape has been described in the reference. The time has been indicated as curve 140 on which the bits form a contiguous sequence. Start bit 142 is followed by mode indication 144 (1–3 bits) indicating an intended bit cell frequency. Indication 146 contains 12 bits source addres plus parity P. Indication 148 contains a 12 bit slave address plus parity P and acknowledge bit A to be generated by the intended destination on the control bus, which is not necessarily the destination station of the signal path to be established, where it may also be any intermediate station along this path. Indication 150 is a four bit control signal plus parity P and acknowledge signal A. Indications 152, 154 relate to the data bytes, inclusive of an end-of-data signalization, a parity bit, and an acknowledge bit. Control information 150 relates to the operation of the single channel bus and the control devices CTR connected thereto. Data bytes 152, 154 on this level operate as data that just are transmitted. On the next level, they may operate as either data, address, or control information for the various local (sub)devices.

SPECIFICATION OF SIGNALS AND OPERATION IN A TYPICAL EMBODIMENT

Hereinafter various signals to be used for control functions are specified, and also an example of operation in a typical embodiment. Now, for any plug in a subdevice it is known to which other subdevice and plug on that subdevice it is connected physically. For internal connections between a switchbox subdevice and a signal source or signal destination subdevice all in the same device this is known beforehand (e.g. programmed by the device manufacturer); for external connections (signal connector cables) it is given by the user at initialization time. For systems of low complexity, the necessary information is procured according to the so-called -default- principle that is generally used in personal computers and the like.

Furthermore, any switchbox subdevice knows its current internal interconnections. This means for each of its plugs, the identity of any other plug (zero or more) to which it is currently internally interconnected. All control commands to be specified hereinafter are formatted in the messaged format explained with respect to FIG. 3.

To build up a signal interconnection the bus commands Connect and Select are used. Connect is a command for switchbox (sub)devices. It defines a signal interconnection between a plug of that switchbox (sub)device and another (sub)device that is a source or destination of a signal stream. This latter (sub)device may be directly connected to the switchbox (sub)device, or it may be connected via one or more switchboxes in between. The Select command is directed to signal source and signal destination (sub)devices; it informs a signal source (sub)device that it should supply a signal; or a signal destination (sub)device that it will receive a signal; also, further specifying information is included.

To release a signal interconnection the commands Disconnect, Deselect-subdevice and Deselect-plug are used. Disconnect is a command for switchbox (sub)devices. This command has the same operands categories as the Connect command: it is used to release a signal path that has been built with a Connect command.

Deselect-subdevice is a command for signal destination (sub)devices and signal source (sub)devices. It is used to inform such a (sub)device that it will not receive a signal anymore, or that it no longer needs to produce signals, respectively.

Disconnect-plug is a command for switchbox (sub)devices. It is used to inform the switchbox that the signal path via the given plug is no longer needed.

Furthermore, to investigate a current signal interconnection a number of requests are used; these are also transmitted on the control bus.

The Connected request is used to verify if the latest Connect command was successful. It is a request for switchbox (sub)devices.

The Connected-to-subdevices request is a request for signal source and signal destination (sub)devices. It is used to investigate if such a (sub)device is currently active, and if so, to what other (sub)device and plug on that subdevice it has currently a signal interconnection.

The Connected-to-switchbox request is a request for switchbox (sub)devices. It is used to investigate for a given plug of that switchbox, to which other (sub(devices and plugs on these (sub)devices the given plug has currently signal interconnections.

These last two requests (Connected-to-subdevice and Connected-to-switchbox) result in the directly connected subdevices and plugs (if any). The connection in question may be inside the device if switchbox and connected subdevice are both subdevices of the same device, otherwise, it is a signal cable from the switchbox to a plug in another device.

Hereinafter, three examples of the use of the above-mentioned commands will be given:

For example, suppose that CDV-device 46 in FIG. 2 wants to play on (TV, PIP) (52) and therefore must make a signal connection to (TV, PIP).

The following control bus commands and requests can be used to achieve this; the bus messages address the devices and subdevices by name; it is not necessary that the message orginator knows where the message destination device is located physically.

CDV (46)

CDV sends to Switchbox 50 the command Connect plug 2 to (TV, PIP).

CDV sends to Switchbox 50 Request Connected plug 2 to (TV, PIP).

CDV repeats this question periodically until an answer "Connected" or "Not connected" is received.

Switchbox (50)

receives bus Connect command from CDV, and therefore issues another bus Connect command to switchbox 48 in the same way CDV 46 had done earlier to switchbox 50. The parameters for the Connect command are plug 4 (of switchbox 48) and (TV, PIP). No other device receives this command, because in switchbox 50 no TV-PIP subdevice is known to be directly connected to switchbox 50 and also, no other switchbox subdevice than switchbox 48 is directly connected to switchbox 50. However, in more complicated situations, it could prove necessary to execute a tree-like search by means of the bus commands/requests through the interconnected switchbox (sub)devices. It should be noted that there is no a priori restriction to the interconnection pattern of the switchboxes. In connection with the above Connect command, switchbox 50 issues to switchbox 48 the Request connected with the same parameters (plug 4, TV, PIP). Again, this latter request is repeated until an answer, either "Connected" or "Not connected" is received. If the answer received is "Connected", the switchbox 50 makes internally a connection between its plugs 2 (connected to CDV 46) and 1 (connected to switchbox 48). The answer to the Connected request issued by the CDV 48 is now "Connected". If the answer received by switchbox 50 is "Not connected", switchbox 50 does not make any new interconnection between its plugs. If applicable, any existing interconnection is left active. The answer given by switchbox 50 to the Connected request issued by the CDV device 46 is now "Not connected".

Switchbox 48

Switchbox receives the Connect command and the Connected request from switchbox 50. Initially, it does not know to which of the other switchboxes (SB) in devices VCR1 (42), VCR2 (44) and TV (52) the subdevice TV-PIP is actually connected. Therefore, it successively interrogates all of those three switchboxes. As regards the switchbox of TV device 52, the parameters of the command are (plug 1, TV, PIP). As regards the switchbox of device VCR1 (42), the parameters are (plug 3, TV, PIP). The latter command would obviously be not successfull, and upon reception of the ensuing answer "Not connected", the switchbox 48 would, if applicable, turn to interrogating another switchbox. In the case of switchbox TV, SB a "Connected" answer would result, and the switchbox 48 will then make the connection between its plugs 4 (connected to switchbox 50) and 5 connected to switchbox SB in device 52. The reaction to a "Not connected" answer has been described earlier.

Switchbox in device TV 52

This receives the Connect command from switchbox 48 and therefore:

issues a Select command to the PIP inside the TV makes internal connection plug 1–plug 3

(TV, SB) answers to a Connected request from switchbox: "Connected".

PIP in TV receives the Select command from (TV, SB) and starts displaying the incoming signal, on the signal interconnection now activated. Next, the operation for changing an interconnection is described. This may imply that in a particular switchbox device one interconnection is made (or a plurality of interconnections is made), while one or more other interconnections are interrupted. For example, say connection 2–5 holds in the switchbox 48, and the switchbox is changed to connection 2–6 (and connection 2–5 is now broken). Now the following commands are issued.

Switchbox because connection to plug 5 of the switchbox is broken: Switchbox to (TV, SB): Deselect-plug 1.

SB in TV receives the "Deselect-plug 1" command from Switchbox.

say plug 1 of (TV, SB) is currently connected to plug 2 of (TV, SB). Then (TV, SB) issues the command "Deselect-subdevice" to (TV, Mon), because plug 2 of (TV, SB) is connected to (TV, Mon).

Mon in TV receives the "Deselect-subdevice" command. This means that it does not receive signal input anymore. Therefore (TV, Mon) may decide to go in standby, for example.

In case the channel to be broken runs through more switchboxes a similar search may be made as the one executed for setting up a connection. However, inasmuch as every (sub)device know its internal connections realized for setting up the path, the search can follow this path and thus be executed more quickly. In conjunction to the disconnection operation, the changed interconnection may be activated in the same manner as described earlier.

Next, the operation for tracing an actual connection is described.

For example, suppose that the deck of VCR1 (42) wants to know the source of a monitor signal, that is, in fact, provided by Monitor device 56. However, initially this information is not present in device 42. The following requests are now used. First, the initiating subdevice (VCR1, Deck) issues a Connect-to-Subdevice request to Monitor 56. If this monitor is in an active state, it will then answer that it is connected to plug 50 of switchbox 50. Thereupon, subdevice (VCR1, Deck) issues a "Connected to Switchbox 50, plug 5" request to switchbox 50. In case plugs 1, 5 of switchbox 50 are presently interconnected, switchbox 50 will answer to this request -plug 4 of switchbox 48-. Now, in switchbox 48 plugs 3 and 1 may be interconnected, the former being connected the switchbox subdevice of VCR2 (44). Thus, upon being addressed by means of the "connected to switchbox 48, plug 4 connected-to-subdevice" request, switchbox 48 will answer by "plug 3 of (VCR2, SB)". Finally, subdevice (VCR1, Deck) issues the "connected to switchbox VCR2, SB), plug 3 to subdevice (VCR2, SB). Say, plug 3 of (VCR2, SB) is currently connected to plug 1 of (VCR2, SB). This plug is connected to (VCR2, Deck). Hence (VCR2, SB) answers on the request: (VCR1, Deck).

(VCR1, Deck) now knows that Monitor has a signal connection to (VCR2, Deck). (VCR1, Deck) may now send to (VCR2, Deck) a request to verify if it is active.

Now, the requests and commands contain various operands and control codes. The device address normally has twelve bits, subdivided into three fields: the service type (e.g. specifying audio-video devices) of 4 bits, the device type of 5 bits, and the device number of 3 bits. Together with 4 stuffing bits, this fills two message bytes. In similar way, a 10 bit subdevice address is defined. The plug number is specified in one byte; 64 different values are defined. A connect command has one byte opcode, two operands specifying plug number and device/subdevice address of input and output of the connection, respectively. Disconnect command differs primarily with respect to the opcode. Select command has one byte opcode; it may specify a signal type. No address parameter is necessary. Deselect-subdevice command has similar format Deselect-plug command has the same format, enhanced with a plug number. Connected request has one byte opcode, two operands, specifying plug number and device/subdevice address. The answer contains one or two bytes to the originator of the request, specifying the result. Connected to subdevice request primarily consists of one byte opcode. The answer may specify the following:

subdevice in standby (only 2 opcode bytes);

subdevice active; specifying device/subdevice address and signal type communicated with connected (sub)device;

idem, externally connected to switchbox; specifying device/subdevice, signal type and plug number.

Connected to switchbox request specifies request code and plug number. The anser specifies the plug number(s), and the relevant device/subdevice addresses.

EXAMPLE OF A SWITCHBOX DEVICE

Figure 4:
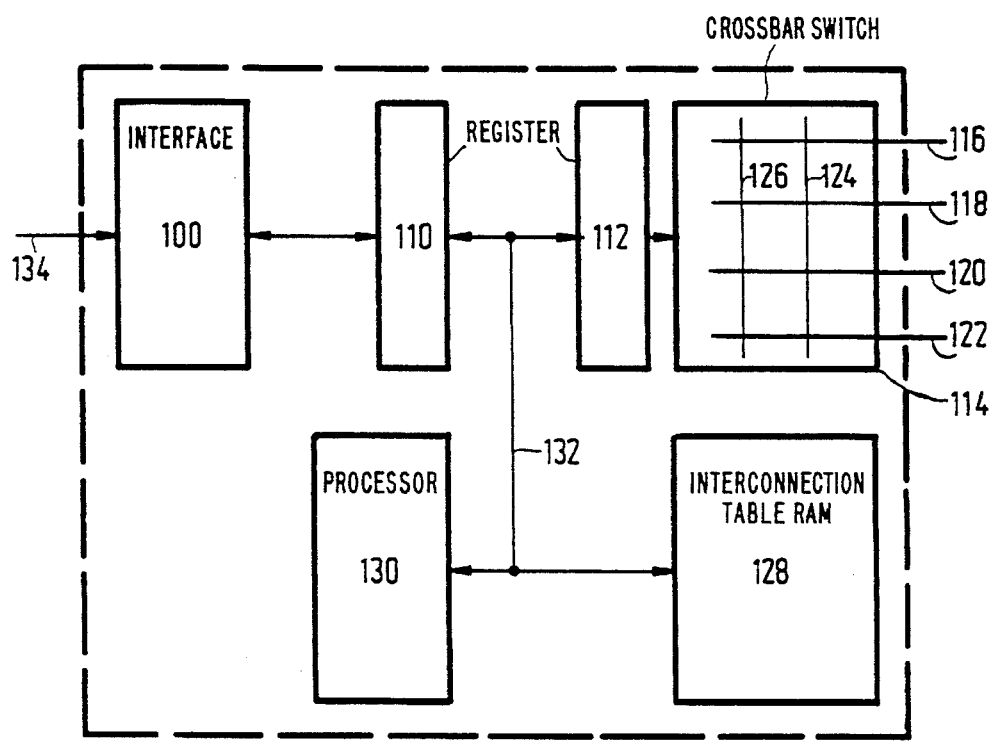
FIG. 4 is a block diagram of a switchbox.

FIG. 4 is a block diagram of a switchbox (sub)device. Line 134 indicates a single-channel control bus according to the reference. Thereto, element 100 is the interface that accounts for arbitrage on the bit level, recognizing the own address of the switchbox, formatting messages and extracting data. Such data then is sent to byte register 110. Register 110 interfaces to internal bus 132, on which traffic is controlled by processor 130 according to general data processing principles. Generally no specification of address/data/control paths has been given. Processor 130 interrogates register 110, decodes various opcode and other control bytes and if necessary, controls interconnection of the four signal connections 116 . . . 132 by means of cross-bar arrangement 114; by means of two leads 124, 126 two arbitrary pairs can be formed between connections 116 . . . 122. The actual control is effected by register 112, that is also loaded by processor 130 via bus 132. The data, such as device/subdevice addresses/plug numbers/signal types relating to the four connections 116 . . . 122 are memorized in interconnection RAM 128 which has allocated respective storage space to each of connections 116 . . . 122. Processor 130 thus continually controls all other elements. With respect to the signals on connections 116 . . . 122 the switchbox is organizationally passive. For simplicity, organization on a lower level than processor 130 has not been shown: program store, ALU, instruction decoding, register stack, data RAM, bus interface to bus 132, all generally may be of conventional construction.

The other devices may have a similar set-up. However, inasmuch as they have only one signal interconnection, no cross-bar 114 is necessary and also, other control is simplified. Notably, the interconnection RAM may be replaced by one or only a few hardware registers. On another level, such other devices could be of far greater complexity than the switchbox, but this latter complexity is unrelated to the tactics of the network function.

We claim:

1. A local communication bus system comprising a) a serial control bus;

b) a plurality of devices attached to the serial control bus, which devices each have at least one plug and which devices are pairwise interconnected between their respective plugs, at least one of the devices being a plural-plug switchbox means;

c) means for establishing and specifying a signal path between a source device and a destination device, which establishing means comprises:
  i) in each respective device, respective interconnection table means for storing information indicating:
    A) any other device pairwise interconnected to said respective device; and
    B) a respective pair of plugs for each said other device, said respective pair of plugs connecting said other device and said respective device, which pair of plugs comprises a first plug in said respective device and a second plug in said other device
  ii) in said source device, first message generating means for generating on said control bus
    A) a connect control command, when said source device and destination device are not pairwise interconnected, said connect control command including an indication of said destination device; and
    B) a select control command, directed to said destination device, for signalling and specifying the signal path to said destination device;
  iii) in each respective switchbox means,
    A) respective interrogating means for searching the respective interconnection table means in the respective switchbox means in order to identify any respective plug which is pairwise connected to said destination device; and B) respective control means for, if the respective switchbox means is not connected directly to the destination device, controlling said first switchbox means to act as a secondary source device, which controlling includes
  I) producing a further connect control command;
  II) transmitting said further connect control command, along with the select control command, to a further one of the switchbox means which is pairwise connected to the respective switchbox means;
so that the plurality of switchbox means iteratively reach the destination device after a sequence of Connect control commands by identifying a second sequence of pairwise interconnections, starting from said source device and terminating in said destination device, which second sequence constitutes said signal path, whereby said destination device receives and is activated by said select control command.

2. The system of claim 1, wherein
a) said source device further comprises second message generating means for generating and transmitting via the signal path
  i) a disconnect control command, indicating said destination device, and
  ii) a deselect control command, for said destination device,
b) each respective switchbox means connected in said signal path further comprises
  i) means for identifying, using the respective interconnection table means, a plug of the respective switchbox means corresponding to said signal path; and
  ii) means for, when said destination device is not directly connected to the respective switchbox means, generating and transmitting a further disconnect control command along with the deselect control command to said further one of the switchbox means;
whereby said disconnect control command is iteratively transmitted along with said deselect control command, along said signal path, thereby signalling abandonment of said signal path and deactivating said destination device with respect to said path.

3. The system of claim 1 wherein
a) at least one of said switch box means is an internal switchbox sub-device within said source device; and
b) said connect control command
  i) informs the destination device of an intended signal transfer; and
  ii) specifies said transfer.

4. The system of claim 1, wherein
a) said source device has second message generating means for generating and transmitting via the signal path
  i) a disconnect control command, indicating said destination device, and
  ii) a deselect control command, for said destination device,
b) each switchbox means connected in said signal path includes
  i) means for identifying, using the respective interconnection table means, a plug within the respective switchbox means corresponding to said signal path; and
  ii) means for when said destination device is not connected directly to the respective switchbox means, generating and transmitting a further disconnect control command along with the deselect control command to said further one of the switchbox means;
whereby said disconnect control command is iteratively transmitted along with said deselect control command, along said signal path, thereby signalling abandonment of the signal path and deactivating said destination device with respect to said path; and
c) said disconnect control command comprises commands to
  i) disconnect a local plug of a switch sub-device which is internal to the source device, which local plug is part of the signal path; and
  ii) disconnect a remote plug of the switchbox means, which remote plug is part of the signal path.

5. The system of claim 1, wherein said serial bus is a single channel bus, which is independent of the pairwise interconnections between the devices.

6. The system of claim 1 wherein said first message generating means comprises means for continuously producing a connected request signal, after said connect control command, to evoke a positive or negative indication as to whether said signal path is connected, which positive or negative indication may come from any device or sub device along said signal path.

7. The system of claim 1 wherein at least one of the devices further comprises
a) at least one subdevice having at least one plug for connecting to another device; and
b) means for producing a connected-to-subdevice request for requesting
  i) information as to whether a particular one of the at least one subdevice is active, and
  ii) if the particular subdevice is active, what plug on what other device the particular subdevice is communicating with.

8. The system of claim 1 wherein at least one of the devices further comprises
means for producing a connected-to-switchbox request signal for requesting information, with respect to a particular plug of a particular switchbox means, as to which other devices, subdevices, and plugs on these other subdevices, the particular plug has an active signal connection.

9. The system of claim 1, wherein
a) said source device further comprises second message generating means for generating and transmitting via the signal path
  i) a disconnect control command, indicating said destination device, and
  ii) a deselect control command, for said destination device,
b) each respective switchbox means connected in said signal path further comprises
  i) means for identifying, using the respective interconnection table means, a plug of the respective switchbox means corresponding to said signal path; and
  ii) means for, when said destination device is not connected directly to the respective switchbox means, generating and transmitting a further disconnect control command along with the deselect control command to said further one of the switchbox means;
whereby said disconnect control command is iteratively transmitted along with said deselect control command, along said signal path, thereby signalling abandonment of said signal path and deactivating said destination device with respect to said path;

c) at least one of said switch box means is an internal switchbox sub-device within said source device; and d) said connect control command
   i) informs the destination device of an intended signal transfer; and
   ii) specifies said transfer.

10. A source device for use in a local communication bus system which includes a) a serial control bus; and b) a plurality of devices attached to the serial control bus, which devices each have at least one plug and which devices are connected between pairs of their respective plugs, at least one of the devices being a plural-plug switchbox means, which source device comprises means for establishing and specifying a signal path between the source device and a destination device, which establishing means comprises:

i) interconnection table means for storing information indicating:
   A) any other device connected via a single pair of plugs to said source device; and
   B) a respective pair of plugs for each said other device, said respective pair of plugs connecting said other device and said source device;

ii) first message generating means for generating
   A) a Connect control command, when said source device and destination device are not connected via a single pair of plugs, on said control bus, said Connect control command indicating said destination device; and
   B) a Select control command, directed to said destination device, for signalling and specifying the signal path to said destination device.

11. The device of claim 10, wherein said first message generating means comprises means for continuously producing a connected request signal, after said connect control command, to evoke a positive or negative indication as to whether said signal path is connected, which positive or negative indication may come from any device or sub device along said signal path.

12. The device of claim 10, further comprising second message generating means for generating and transmitting via the signal path
a) a disconnect control command, indicating said destination device, and
b) a deselect control command, for said destination device, so that said disconnect control command is iteratively transmitted along with said deselect control command, along said signal path, to signal abandonment of said signal path and deactivate said destination device with respect to said path.

13. A switchbox device for use in a local communication bus system which includes a) a serial control bus; and b) a plurality of devices attached to the serial control bus which switchbox device comprises:

i) a plurality of plugs for coupling with the other devices;

ii) interconnection table means for storing information indicating
   A) any other device which is connected to the switchbox device via a single pair of plugs; and
   B) a respective pair of plugs for each said other device, said respective pair of plugs connecting said other device and said switchbox device, which pair of plugs comprises a first plug in said switchbox device and a second plug in said other device;

iii) interrogating means for, responsive to a connect control command received on said serial bus, which connect control command indicates a destination device, searching the interconnection table means to identify any respective plug which is connected to said destination device iv) control means for, if the switchbox means is not connected to the destination device, controlling the switchbox means to act as a secondary source device, which controlling includes
   A) producing a connect control command;
   B) transmitting said connect control command, along with a select control command for the destination device, to a further switchbox means which is connected to the switchbox means;

so that the switchbox device, in conjunction with the further switchbox means, iteratively effects a signal path from the source device to the destination device after a sequence of connect control commands, by identifying a sequence of connections via respective single pairs of plugs.

14. The device of claim 13 that is an internal sub-device in a device which also contains at least two further sub-devices, said further subdevices each being connected by to said switchbox sub-device via a respective single pair of plugs, a respective first one of each pair of plugs being in the switchbox sub-device and a respective second one of each pair of plugs being in one of the further sub-devices.

15. The device of claim 13, wherein
a) the plurality of plugs contains at least three plugs;
b) the interconnection table means comprises a processor and memory; and
c) the device further comprises a buffer register for storing received commands and addresses.

16. The device of claim 13, further comprising
a) means for identifying, using the respective interconnection table means, a plug of the respective switchbox means corresponding to said signal path; and
b) means for, when said destination device is not directly connected to the switchbox device, generating and transmitting a further disconnect control command along with a deselect control command, from the source device, to said further switchbox means; whereby said disconnect control command is iteratively transmitted along with said deselect control command, along said signal path, thereby signalling abandonment of said signal path and deactivating said destination device with respect to said path.

17. The device of claim 10 or 13 further comprising
a) at least one subdevice having at least one plug for connecting to another device; and
b) means for producing a connected-to-subdevice request for requesting
   i) information as to whether a particular one of the at least one subdevice is active, and
   ii) if the particular subdevice is active, what plug on what other device the particular subdevice is communicating with.

18. The device of claim 10 or 13
means for producing a connected-to-switchbox request signal for requesting information, with respect to a particular plug of a particular switchbox means, as to which other devices, subdevices, and plugs on these other subdevices, the particular plug has an active signal connection.

19. Apparatus, for use in a device in a local communication bus system, which system includes a plurality of devices connected via a serial bus, for establishing and specifying a signal path, which apparatus comprises:
  a) interconnection table means for storing information indicating:
    i) any other device pairwise interconnected to said device; and
    ii) a respective pair of plugs for each said other device, said respective pair of plugs connecting said other device and said device, which pair of plugs comprises a first plug in said device and a second plug in said other device;
  b) means for reading from the interconnection table means;
  c) means responsive to the reading means for connecting to said other devices.

20. A method for establishing a connection between devices connected via a serial bus in a local communication bus system comprising the steps of
  a) transmitting a connect control command from a source device, said connect control command including an indication of a destination device;
  b) receiving said connect control command in a switchbox device;
  c) within the switchbox device, comparing the connect control command with data stored in an interconnection table means, the interconnection table means storing information indicating:
    i) any other device pairwise interconnected to said switchbox device; and
    ii) a respective pair of plugs for each said other device, said respective pair of plugs connecting said other device and said switchbox device, which pair of plugs comprises a first plug in said device and a second plug in said other device; and
  d) establishing a connection from the switchbox device to the destination device based on a result of the comparing step.

21. The method of claim 20, wherein said establishing step further comprises, if the switchbox device is not connected to the destination device, the steps of
  a) producing a further connect control command; and
  b) transmitting said further connect control command to a further switchbox device which is pairwise interconnected to the switchbox device, so that a plurality of switchbox devices iteratively reach the destination device after a sequence of connect control commands, by identifying a second sequence of pairwise interconnections starting from said source device and terminating in said destination device, which second sequence constitutes said signal path.

22. The method of claim 20 further comprising the step of transmitting a select control command along with the connect control command, which select control command is for selecting the destination device.

\* \* \* \* \*

UNITED STATES PATENT AND TRADEMARK OFFICE
CERTIFICATE OF CORRECTION

PATENT NO. : 5,463,619
DATED : October 31, 1995
INVENTOR(S) : van Steenbrugge et al.

It is certified that error appears in the above-indentified patent and that said Letters Patent is hereby corrected as shown below:

Column 9, line 14, change "Connect" to --connect--.

Column 11, line 29, change "Connect" to --connect--;
        line 32, change "Connect" to --connect--;
        line 34, change "Select" to --select--.

Column 12, line 25, delete "by".

Signed and Sealed this

Ninth Day of July, 1996

Attest:

BRUCE LEHMAN

*Attesting Officer*     *Commissioner of Patents and Trademarks*